United States Patent
Hrazdera

(10) Patent No.: US 6,942,595 B2
(45) Date of Patent: Sep. 13, 2005

(54) CONTROL SYSTEM FOR THE DRIVE OF A PTO FOR AN AGRICULTURAL VEHICLE

(75) Inventor: Oliver Hrazdera, Nevhofen (AT)

(73) Assignee: CNH America LLC, New Holland, PA (US)

( * ) Notice: Subject to any disclaimer, the term of this patent is extended or adjusted under 35 U.S.C. 154(b) by 234 days.

(21) Appl. No.: 10/236,589

(22) Filed: Sep. 6, 2002

(65) Prior Publication Data

US 2003/0070819 A1 Apr. 17, 2003

(30) Foreign Application Priority Data

Sep. 15, 2001 (DE) .......................... 101 45 643

(51) Int. Cl.⁷ .................. B60K 41/12; B60K 25/08; F16H 59/64
(52) U.S. Cl. ................. 477/37; 477/98; 180/53.6; 180/900
(58) Field of Search .................. 180/53.61, 53.7, 180/900, 53.6; 477/37, 41, 42, 43, 98, 115; 74/11, 15.4, 15.63, 15.66; 701/50, 51

(56) References Cited

U.S. PATENT DOCUMENTS

| | | | | |
|---|---|---|---|---|
| 4,489,623 A | * | 12/1984 | Hakkenberg | 74/378 |
| 4,658,943 A | * | 4/1987 | Nishikawa et al. | 477/36 |
| 4,964,317 A | * | 10/1990 | Murano et al. | 477/45 |
| 5,067,933 A | * | 11/1991 | Hardesty et al. | 475/83 |
| 6,022,292 A | * | 2/2000 | Goodnight | 477/121 |
| 6,063,002 A | * | 5/2000 | Nobumoto et al. | 477/41 |
| 6,144,910 A | * | 11/2000 | Scarlett et al. | 701/50 |
| 6,386,303 B1 | * | 5/2002 | Zibuschka et al. | 180/53.3 |
| 6,418,367 B1 | * | 7/2002 | Toukura et al. | 701/54 |
| 6,546,705 B2 | * | 4/2003 | Scarlett et al. | 701/50 |
| 6,547,012 B2 | * | 4/2003 | Scarlett et al. | 74/337 |
| 6,615,963 B2 | * | 9/2003 | Ono et al. | 74/15.63 |

FOREIGN PATENT DOCUMENTS

| | | | | |
|---|---|---|---|---|
| JP | 362286847 A | * | 12/1987 | 477/98 |

* cited by examiner

Primary Examiner—Roger Pang
(74) Attorney, Agent, or Firm—John William Stader

(57) ABSTRACT

A control system for the drive of a power take-off mechanism on an agricultural tractor that records machine-specific values of the implement attached to the tractor. The drive train between the tractor engine and the power take-off includes a CVT transmission. The control device is connected with a processor via a signal lead for receiving its output signals. The control device is connected for the formation of output signals via input leads with switches, controls, sensors, and actuators for the tractor to read the machine specific parameters of the attached implement.

11 Claims, 2 Drawing Sheets

CONTROL SYSTEM FOR THE DRIVE OF A PTO FOR AN AGRICULTURAL VEHICLE

BACKGROUND OF THE INVENTION

The present invention relates to a control system for the drive of a power take-off mechanism on an agricultural vehicle, and, particularly, a tractor having a CVT transmission and a control for reading machine specific values of an implement attached to the tractor.

The drive of a pto on a tractor, which in principle coincides with such drives on all the other agricultural vehicles, is at present constructed in such a way that a gear box is connected to its engine for producing the speeds of 540, 750, 1000 or 1400 rpm which are usual in practice. Its drive shaft is connected to the input shaft by means of a hydraulically actuated clutch, to which pressure is admitted from the hydraulic circuit of the tractor via a solenoid valve, This drive train continues through the output shaft of the hydraulically actuated clutch, on which a brake of any desired type is arranged, up to the pto of the tractor.

At one end of the pto a drive shaft is attached, which is connected at its other end so as to drive the pto stub of an implement attached to the lift which is attached either at the front or the rear of the tractor. The control system for previously known drives for a pto is orientated exclusively towards the optimal design of acceleration and deceleration of the pto through the engagement and disengagement of the hydraulically actuated clutch, which is achieved by varying the quantity and with it the pressure build-up up or decay in the hydraulic fluid passed into the hydraulically actuated clutch. After the acceleration, control is no longer envisaged, so that then the speed of the pto in operation is directly proportional to the speed of the engine on the tractor.

For such control systems a multitude of variant embodiments has already become known, one of which is elaborated in WO 99/56978 A1. There a control device is fixed on the tractor, which contains a processor, which runs a special control program in accordance with the input signals passed to it and produces appropriate output signals. In so-called normal operation, the input signals come each from a pushbutton for switching the pto on and off and from a sensor for monitoring the engine speed and from a further sensor for monitoring the speed of the pto. Optionally the operator can switch over from a so-called HTS (headland turn sequence) to management operation, where further input signals can be sent to the control device via a pushbutton for switching on HTS or management operation and via sensors for monitoring the speed of the rear axle and the lift status (control and transport).

The output signals are passed on to a solenoid valve functioning as a switching valve, which in this case is a pulse-width modulated ON/OFF valve. This solenoid valve then passes the adjacent pressure of the hydraulic fluid from the hydraulic circuit of the tractor to the hydraulically actuated clutch, so that this engages and disengages smoothly over a definite period of time in accordance with a special control program from the control device. One part of the input signals ensures the smooth occurrence of these functions and another part in management operation controls automatically in addition the engagement and disengagement respectively of the hydraulically actuated clutch in accordance with the lift status of the tractor and its travelling speed, for which additional safety circuits are installed for the protection of the operator.

Detrimental to this control system is that it is designed for optimal engagement or disengagement respectively, by which is understood as rapid as possible and smooth engagement for avoiding wear and tear on the hydraulically actuated clutch, the transmission of high torques harmlessly through the clutch and for the avoidance of breakage of shear pins on the implement, important conditions of use were not taken into account. These include on the one hand changes in the viscosity of the hydraulic fluid through varying external temperatures. On the other hand no influence on the engagement process was accepted by the special control program in the control device, when at the moment of acceleration widely differing implement are employed. Likewise the initial speeds of the engine at the moment of acceleration or deceleration of the pto were ignored in the control program, although it is known that they can fluctuate markedly in consequence of the differing power taken from the engine.

A further disadvantage in this control system is seen, in that no facility for a manually variable adjustment for the smoothness of engagement and disengagement is envisaged. Therefore in this variant implementation it is a question of only a quite normal control mechanism, which cannot react by far so variably as a normal control system. All the stated disadvantages are the reason that the hydraulically actuated clutch thus controlled, the remaining drive elements and the implement under these conditions exhibit only a limited service life, as acceleration proceeds too abruptly. Furthermore, it is still to be criticised in this control mechanism, that in HTS or management operation respectively no influence was exerted on the engagement and disengagement of the hydraulically actuated clutch in relation to the desired lift height of the implement, which would however have been entirely desirable, given the variability of the implements that may be employed.

As a result on the one hand, damage to the drive shaft can occur, if this is not stopped in good time before a high angle of flexion is attained when the lift is raised, or if already in the presence of a high angle of flexion it is switched on again too soon. On the other hand in the converse case, when lowering the lift the drive shaft is not switched on again in good time, lost time occurs, which diminishes the effective time of use of the tractor, and at the same time the risk exists that in that event the engine stalls, as the implement is already in contact with the ground before the pto turns.

A further variant of a control system for accelerating and decelerating a pto on a tractor was published in EP 0 443 325 A1, its principal objective is to avoid, for the hydraulically actuated clutch and for the subsequent drive elements up to the implement under critical operating conditions, increased wear and tear and in the extreme case destruction of all the drive elements and the implements. The construction of this control system which is likewise working only as a control mechanism, coincides fully with solution described in the preceding paragraphs, as it likewise possesses a control device which picks up an input signal and from it forms an output signal, in which the output signals are passed on to a solenoid valve functioning as a switching valve for engaging or disengaging the hydraulically actuated clutch in the drive train to the drive shaft. In a preferred embodiment the solenoid is a proportional valve, which is driven by timed pulses from the control device and is thereby actuated.

As input signal, on the one hand the engine speed is monitored, in which the hydraulically actuated clutch is disengaged by the control device in the event of a fall in the engine speed below a certain preset limit, and when this speed is exceeded it is engaged again. As a further input signal the speeds of the input shaft and of the output shaft of the hydraulically actuated clutch are picked up by means of sensors, from the differences in which the control device calculates the slip that exists. If this exceeds a preset limit, then the hydraulically actuated clutch is disengaged and when the slip falls below this value again it is engaged again. In the same way torsional vibrations in the input shaft and the output shaft of the hydraulically actuated clutch are processed as input signals. Finally the height of lift of the lifting gear on the tractor is followed, and when a prescribed limit is reached it is disengaged.

For the purpose of achieving engagement that is as rapid and smooth as possible, a characteristic curve is stored in the control device, the function of which is comparable with the control program of the control mechanism in accordance with WO 99/56978 A1. As regards the disadvantages of this control mechanism, to avoid recapitulation of the disadvantages of the first described control mechanism, it is pointed out that these are identical. However a further disadvantage arises in addition for this control mechanism, as in it no HTS or management operation is provided for. In addition, both of the variant embodiments described in the foregoing have quite significant common disadvantages. Thus acceleration and deceleration of the pto is mostly unsatisfactory, as the hydraulically actuated clutch permits only short wear times.

To improve this situation, therefore, very complicated and hence cost-intensive control systems are employed. The necessity for the presence of a clutch, a gearbox with long gear levers and a brake leads necessarily to a large construction, which results in disadvantages in the design of the driver's cab. In addition the clutch is an expendable part that wears out and incurs costs. But also after acceleration of the pto, quite significant disadvantages arise for its drive through the lack of a control system in this area. Thus through the direct driving connection between the engine of the tractor and the pto with interposition of the gearbox and the hydraulically actuated clutch a continuously variable selection of the pto speed independently of the engine speed is not possible.

This means that the engine must be driven constantly in a high-speed range, so that the fuel consumption of the engine is high and the driver is thereby subjected to unnecessary annoyance through noise. In addition, it is still to be criticised that the PTO MODE to be found in some agricultural vehicles, by which is to be understood keeping the engine speed constant at all driving speeds, experiences limitations, as at a constant engine speed the driving transmission ratio can be altered only very slowly and hence the vehicle becomes sluggish.

In the case, which occurs not seldom in practice, that the speed of the engine drops also the maximum speed of the pto is limited. This circumstance leads in the case of implements that require a very constant pto speed, that these are switched off from the drive automatically. A very typical example of this would be the use of a sowing machine. Finally, with such a drive the mode of working of the pto as an accurate ground speed pto cannot be realised. A very important disadvantage of this drive is also that reversal of the direction of rotation of the pto is not possible.

SUMMARY OF THE INVENTION

It is an object of the present invention to provide a control system for a tractor power take-off mechanism that relates to specific parameters of an implement attached to the tractor.

Therefore the objective of the invention is based upon creating a control system for the drive of a pto on an agricultural vehicle, which overcomes the aforementioned disadvantages.

This objective is solved according to the invention with the features in accordance with claim 1, where the features are listed in the subclaims, which further develop this solution in an advantageous manner.

Through the arrangement of a CVT transmission (continuously variable transmission) as a continuously variable gearbox in the drive train between the engine and the pto of an agricultural vehicle and its connection with control device with a processor, it has become possible to execute the acceleration and deceleration of the pto practically unrestricted as regards time. As a result, now smooth acceleration and deceleration even when operating implements with a very high power uptake is assured.

Driving of the CVT transmission by the control device dependent upon the most varied input signals after the acceleration of the pto brings about that this can be driven at preselectable continuously variable speeds via a potentiometer. This applies both to forwards and also reverse running of the pto. A functionally very important aspect of this is that the selected speed is attainable completely independently of the instantaneous speed of the engine of the agricultural vehicle. Thus the pto can be driven by the CVT transmission at maximum speed even from the idling speed of the engine. In addition, the CVT transmission is in a position to keep to the chosen speed of the pto very precisely, so that the driving of implements is assured without concessions, which for functional reasons requires exact drive speeds. On the other hand, however, with the CVT transmission it is also possible to run the pto as a ground speed pto, in which its speed is aligned directly proportional to the travelling speed of the agricultural vehicle. Finally, such a control system for the drive of a pto is employable also on agricultural vehicles with conventional and also CVT driving transmissions, since with it the special driving modes for the agricultural vehicle, which restrict the driving characteristics, have become superfluous.

According to features of the invention the same effect is to be achieved if the pto is driven by a continuously variably controllable hydraulic engine or electric motor. Naturally in that case the CVT transmission can be omitted.

In an expedient embodiment of the invention, through inclusion of the temperature and the viscosity of the hydraulic fluid in the control system for the drive for the pto it is ensured that every acceleration and deceleration of the pto is nevertheless repeated identically also taking account of these environmental influences which strongly influence the flow characteristics of the hydraulic fluid.

According to other features of the invention, it has proved its worth to connect the control device with a variably adjustable control for normal operation and for the HTS and management operation respectively, through the adjustment of which the time for acceleration and deceleration of the pto is manually variable for the various implements.

A preferred embodiment of the invention employs the possibility of variable adjustment of the position of the lift, in which the CVT transmission, in HTS or management operation, should accelerate automatically or stand still, since various implements because of their differing design and function must have already attained their full speed even in differing design and function must have already attained their full speed even in differing lowered positions, and in certain raised positions only for grounds of safety they must not in any case continue to turn. To do it, the operator must by only turning the variably adjustable control provided for it select the desired angular value for the lift, at which the pto should automatically accelerate or stand still. Attainment of the desired angular value is signaled from the lift position sensor. An alternative possibility consists, instead of the variably adjustable control designed as a potentiometer, in employing a pushbutton with which the desired lift position can be stored.

For continuously variable adjustment of the speed of the pto, it has proved expedient to connect the control device with a pto speed controller, which is arranged on the control and display unit in the driver's cab of the agricultural vehicle.

Another advantageous embodiment of the invention consists in storing in a ROM in the control device the acceleration and deceleration curves for the pto for all conceivable conditions of use, for various different implements and for varying machine-specific values. The control device selects from these, depending upon the input signals passed to it, optimum acceleration and deceleration curves for each implement and sends appropriate output signals via a control line to the CVT transmission.

For switching the CVT transmission on and off, a conventional switch may be employed as an ON and OFF switch.

In a preferred embodiment of the invention it is advisable to connect the control device with a mode switch for selecting between normal operation and HTS and management operation respectively.

Yet another embodiment of the invention consists in connecting the control device with a mode switch for operating the pto as a ground speed pto.

According to a still further embodiment of the invention an advantage is shown in feeding to the control device, as input signals, the instantaneous engine speed, the pto speed, and the pto torque, since fluctuations in these values make other acceleration and deceleration actions by the CVT transmission necessary.

In an additional embodiment of the invention, by means of a sensor in the CVT transmission, it can be established whether the speed of the pto has actually attained the preselected value, which represents and additional safety aspect.

For the sake of better clarity for the operator it has proved its worth to arrange control displays in the control and display unit of the agricultural vehicle. For that at least one CVT transmission ON lamp belongs there, which signals the switched-on state of CVT transmission. In addition an HTS or management ON lamp recommends itself, which by lighting up indicates the activity of an HTS or management operation. An illuminated mode switch is a sign that the ground speed pto is in operation. With a speed display for the pto the operator of the agricultural vehicle is always informed as to with which operating speed the pto.

Finally, according to one further embodiment of the invention, it is recommended to employ for signal processing of the switch, controller, sensors and actuators either a CAN BUS system or a Time Trigger Protocol (TTP) with the same success.

In conclusion, an expedient embodiment of the invention in accordance with the features in subclaim 18 is seen in fixing a job computer on each implement, in which the type of the implement is stored and which is connected with the control device via its own implement BUS. Through the possible identification of the implement in question with it, every acceleration and deceleration of the pto is suited to the implement to be driven.

As a precaution, is it pointed out that the scope of protection of the patent is not limited to a pto arranged at the rear of an agricultural vehicle, but that all other arrangements, such as for example the very frequently occurring frontal and also lateral arrangement on the agricultural vehicle is likewise included.

With this arise summed up as well as the already acknowledged functional advantages also further advantages for this control system for acceleration and deceleration and the driving of a pto on an agricultural vehicle in comparison with the formerly usual hydraulically actuated clutch. An important advantage is that the components involved in the control system and the drive for the pto are subject to considerably less wear and tear. This is automatically in direct relationship to reduced expenditure on maintenance. Furthermore, the expense for the manufacture of such a control system is less for several reasons.

On the one hand, the hydraulically actuated clutch and the brake can be omitted without substitution, since their tasks are taken over by the CVT transmission. On the other hand, the control system for a CVT transmission is designed considerably more simply in comparison with the control system for a hydraulically actuated clutch which represents only a compromise. Also the previously necessary gear shift lever, cables etc. for operating a gearbox which are no longer necessary, could be omitted, through which as well as the reduced expenditure an improved design in the cab results. Besides, through the possibility for the installation of a freewheel mechanism in the CVT transmission the expenditure for the new control system is lowered still further, since it need no longer be present in every drive shaft.

These and other objects, features and advantages are accomplished according to the instant invention by providing a control system for the drive of a power take-off mechanism on an agricultural tractor that records machine-specific values of the implement attached to the tractor. The drive train between the tractor engine and the power take-off includes a CVT transmission. The control device is connected with a processor via a signal lead for receiving its output signals. The control device is connected for the formation of output signals via input leads with switches, controls, sensors, and actuators for the tractor to read the machine specific parameters of the attached implement.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENT

Figure 1:
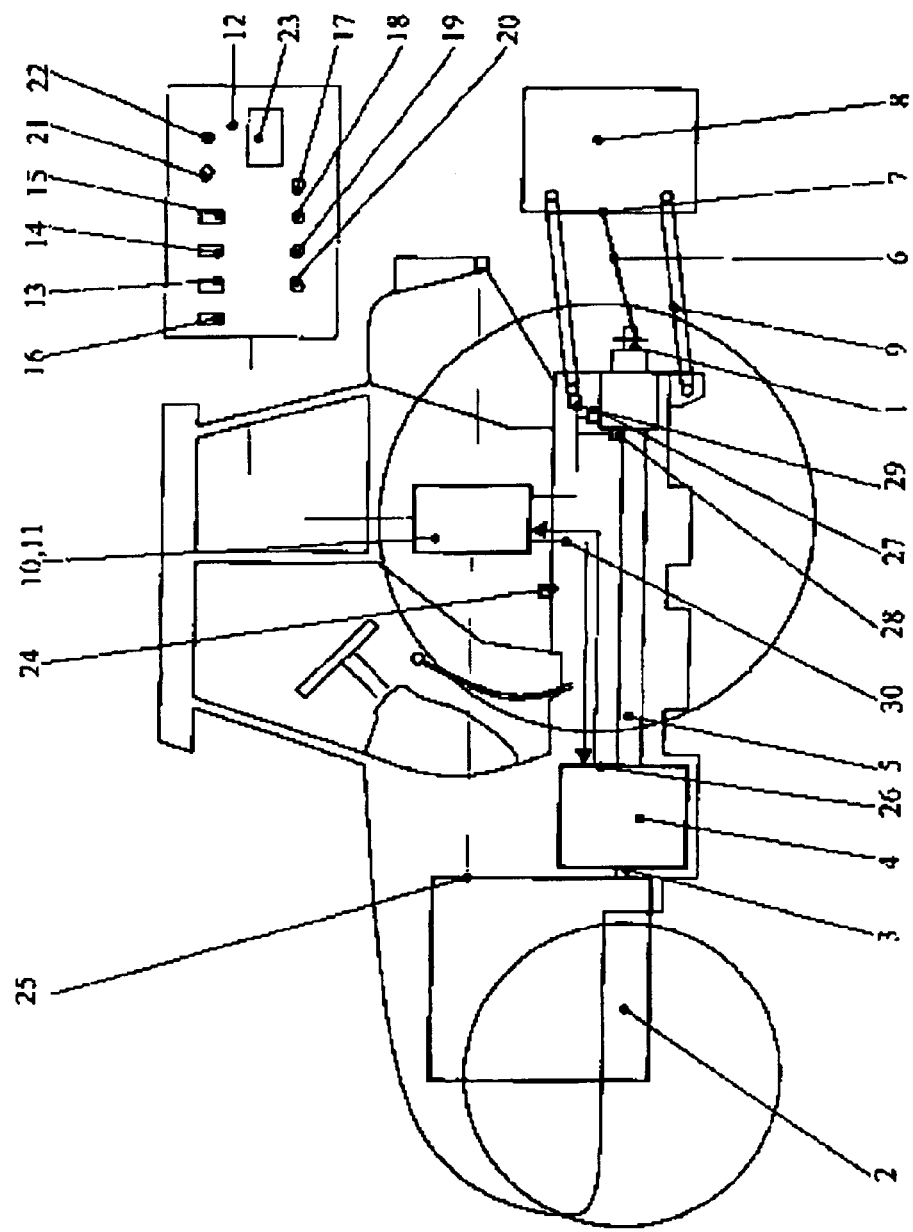
FIG. 1 is a schematic side view of a tractor depicted the components belonging to the control system for the drive of the power take-off mechanism.
Figure 2:
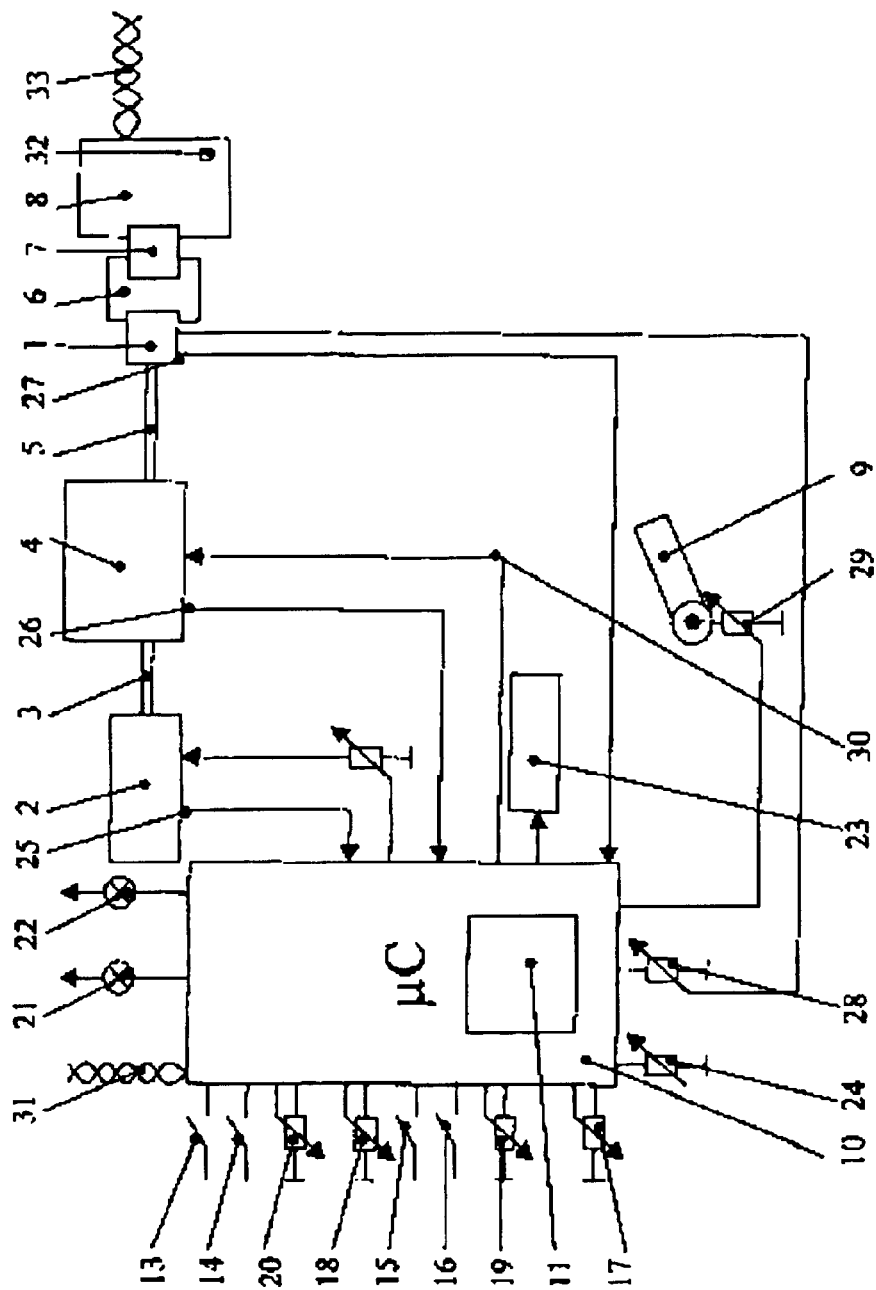
FIG. 2 is an electrical/hydraulic circuit diagram for the control system depicted in FIG. 1.

In FIG. 1 are to be seen in the side view of the left side of the tractor, viewed in the direction of travel, the drive train for driving the pto (1), which starts out from the engine (2) and is connected to the CVT transmission (4) via a shaft (3). With this CVT transmission (4) it concerns a continuously variably operating transmission. The drive train continues through an intermediate shaft (5) up to pto of the tractor. On the pto at one end a drive shaft (6) is attached, which is connected at its other end to drive the pto stub (7) of an implement (8) built onto the tractor, which in this example is suspended on the lift (9) at the rear of the tractor.

An important component for the control system for the drive of the pto (1) is a control device (10), in which a processor (11) is installed for processing a multitude of input signals and for passing on output signals to the CVT transmission (4). A part of the input signals comes from the control and display unit (12) which is situated in the driver's cab, amongst which are included an ON switch (13) and an OFF switch (14) for switching the drive to the CVT transmission (14) on and off. In addition there are a mode switch (15) for the HTS and management operation and a mode switch (16) for the ground speed pto, a variably adjustable control (17) for varying the time for acceleration and deceleration respectively of the pto (1) in normal operation and a further variably adjustable control (18) for varying the time for acceleration and deceleration of the pto in HTS and management operation.

In addition on the control and display unit (12) there is a further variably adjustable control (19) for determining the position of the lift (9), at which the CVT transmission (4) should automatically accelerate or stand still respectively, and a pto speed controller (20) for preselecting the desired speed of the pto. Finally, the control and display unit (12) possesses other control displays, which include a CVT transmission ON lamp (21), an HTS or management ON lamp (22) and a speed indicator (23) for the pto (1).

The control device (10) obtains further input signals from the place where they arise themselves, which includes a sensor (24) for measuring the viscosity and temperature of the hydraulic fluid, an engine speed sensor (25), a CVT transmission ratio sensor (26), which can be supplemented with further sensors for further transmission information, a pto torque sensor (28) and a lift position sensor (29).

The control device (10) sends on output signals to the CVT transmission (4) via a signal lead (30) for the driving ratio to be attained. For signal evaluation of the switch, controller, sensors and actuators a CAN BUS system (31) is employed.

On the implement (8) a job computer (32) is installed, in which the respective type of the implement (8) is stored and which is connected via its implement BUS (33) with the control device (10).

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

I claim:

1. In an agricultural tractor having a drive train operatively interconnecting an engine and a power take-off mechanism for providing operating power to a towed implement, said drive train including a CVT transmission providing power to said power take-off, the improvement comprising:
    a plurality of implement sensing devices mounted on said towed implement and located to measure operational variables critical to the interaction between said tractor and said implement;
    a control device for said power take-off mechanism located on said tractor and connected to said CVT transmission;
    a first electrical signal transmission device interconnecting said plurality of implement sensing devices and said control device, whereby input signals from said plurality of implement sensing devices are processed by said control device to generate output signals to said CVT transmission to optimize the operation of said implement and said CVT transmission;
    said CVT transmission employing hydraulic oil in a circuit to vary the internal pressures and output speeds;
    a plurality of transmission sensing devices associated with said CVT transmission and including a temperature sensor and a viscosity sensor, both in contact with said hydraulic oil;
    said temperature sensor and said viscosity sensor both electronically connected to said control device such that said control device can vary the speed of said CVT transmission in response thereto.

2. The improvement of claim 1, wherein:
    said CVT transmission can operate normally or in HTS or management modes, and said control device includes a mode switch for selectively changing the mode of operation of said CVT transmission from normal to HTS or management modes.

3. The improvement of claim 2, wherein:
    said control device is connected to a first variably adjustable control for varying the time for acceleration and deceleration, respectively, of said power take-off mechanism in said normal operation mode, and a second variably adjustable control for varying the time for the acceleration and deceleration, respectively, of the power take-off mechanism in HTS and management operation modes.

4. The improvement of claim 1, wherein:
    said implement includes a lift mechanism
    said plurality of implement sensing devices includes a lift position sensor for determining the instantaneous position of said lift mechanism on said implement, said control device processing the signal from said lift position sensor and sending a signal to said CVT transmission to cause it to accelerate or stand still.

5. The improvement of claim 1, wherein: said control device is connected to a power take-off speed control device for preselecting the desired speed of the power take-off mechanism.

6. The improvement of claim 1, wherein:
    said control device is connected to an engine speed sensor positioned to determine the speed of the engine.

7. The improvement of claim 6, wherein:
    said control device is connected to a speed sensor for said power take-off mechanism.

8. The improvement of claim 7, wherein:
    said control device is connected to a torque sensor for said power take-off mechanism.

9. The improvement of claim 8, wherein:
    said control device is connected to a ratio sensor for said CVT transmission.

10. The improvement of claim 1, wherein:
    said power take-off mechanism is operatively powered by a continuously variably controllable electric motor, and not said engine.

11. The improvement of claim 1, wherein:
    said power take-off mechanism is operatively powered by a continuously variably controllable hydraulic motor, and not said engine.

* * * * *